(12) United States Patent
Hsu et al.

(10) Patent No.: US 10,551,551 B2
(45) Date of Patent: Feb. 4, 2020

(54) LIGHT GUIDE PLATE AND BACKLIGHT MODULE HAVING THE SAME

(71) Applicant: Optivision Technology Inc., Hsinchu (TW)

(72) Inventors: Li-Jen Hsu, Zhuangwei Township, Yilan County (TW); Chun-Hsien Lu, Hsinchu (TW); Huan-Hsiang Li, Hsinchu (TW); Tsung-Hsien Wu, Hsinchu (TW)

(73) Assignee: OPTIVISION TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/175,447

(22) Filed: Oct. 30, 2018

(65) Prior Publication Data
US 2019/0235150 A1 Aug. 1, 2019

(30) Foreign Application Priority Data
Jan. 26, 2018 (TW) .............................. 107102852 A

(51) Int. Cl.
*F21V 8/00* (2006.01)

(52) U.S. Cl.
CPC ......... *G02B 6/0053* (2013.01); *G02B 6/0088* (2013.01); *G02B 6/0036* (2013.01); *G02B 6/0055* (2013.01)

(58) Field of Classification Search
CPC ... G02B 6/0053; G02B 6/0088; G02B 6/0055
See application file for complete search history.

(56) References Cited

U.S. PATENT DOCUMENTS

| 7,457,510 B2* | 11/2008 | Lee | ...................... G02B 6/0036 |
| | | | 362/612 |
| 2015/0055366 A1* | 2/2015 | Chang | .................. G02B 6/0036 |
| | | | 362/606 |

FOREIGN PATENT DOCUMENTS

| TW | 201007232 A | 2/2010 |
| TW | I574061 B | 3/2017 |

OTHER PUBLICATIONS

Search Report appended to an Office Action, which was issued to Taiwanese counterpart application No. 107102852 by the TIPO dated Oct. 1, 2018, with an English translation thereof.

\* cited by examiner

*Primary Examiner* — Tracie Y Green
(74) *Attorney, Agent, or Firm* — Hamre, Schumann, Mueller & Larson, P.C.

(57) ABSTRACT

A light guide plate includes a light guide layer and a first microstructure layer. The light guide layer has a light exit surface, a back surface, and a light incidence surface interconnecting the light exit surface and the back surface. The first microstructure layer is disposed on the back surface, and includes a plurality of first microstructures spaced apart from one another. Each first microstructure has a polygonal planar base, and two first inclined faces and two second inclined faces which extend from the planar base, and which are proximal and distal to the light incidence surface, respectively. Each first inclined face intersects the respective second inclined face at a respective first ridge. Each first ridge cooperates with the planar base to form a first angle that ranges from 5 to 70 degrees.

20 Claims, 11 Drawing Sheets

LIGHT GUIDE PLATE AND BACKLIGHT MODULE HAVING THE SAME

CROSS-REFERENCE TO RELATED APPLICATION

This application claims priority of Taiwanese Patent Application No. 107102852, filed on Jan. 26, 2018.

FIELD

The disclosure relates to a light guide plate, and more particularly to a light guide plate serving as a component of a planar light source, as well as to a backlight module having such light guide plate.

BACKGROUND

Referring to FIG. 1, a conventional backlight module 1 includes a light guide plate 11, a light source 12 disposed adjacent to one side of the light guide plate 11, and a light reflection sheet 13 disposed adjacent to another side of the light guide plate 11. The light guide plate 11 has a light incidence surface 111 that faces and is spaced apart from the light source 12, a lateral surface 112 that is opposite to the light incidence surface 111, a light reflection surface 113 that interconnects the light incidence surface 111 and the lateral surface 112 and faces the light reflection sheet 13, a light exit surface 114 that is opposite to the light reflection surface 113 and interconnects the light incidence surface 111 and the lateral surface 112, and a plurality of microdots 115 that are disposed on the light reflection surface 113.

According to Snell's law, the light emitted from the light source 12, after entering the light guide plate 11 through the light incidence surface 111 thereof, is supposed to undergo total reflection in the light guide plate 11 since the refraction index of the light guide plate 11 is larger than that of air. Nevertheless, the microdots 115 are able to prevent total reflection of light by directing the light in the light guide plate 11 out of the light guide plate 11. The light directed out of the light guide plate 11 is reflected by the light reflection sheet 13 into the light guide plate 11, thereby being emitted out of the light guide plate 11 through the light exit surface 114 to serve as useful light of the backlight module 1.

Generally, light paths in the backlight module 1 can be divided into the following three categories. First, a light beam 121 emitted from the light source 12 at a relatively large emission angle undergoes more times of total reflection after entering the light guide plate 11, and hence easily reaches one of the microdots 115 when traveling still adjacent to the light incidence surface 111 of the light guide plate 11. Secondly, a light beam 122 emitted from the light source 12 at a relatively small emission angle, after entering the light guide plate 11, normally reaches one of the microdots 115 when traveling only away from to the light incidence surface 111 of the light guide plate 11. Thirdly, a light beam 123 emitted from the light source 12 and entering the light incidence surface 111 of the light guide plate 11 at an angle of nearly 90 degrees undergoes mush less times of total reflection compared to the light beams 121, 122, thereby being usually emitted out of the light guide plate 11 through the lateral surface 112 without reaching the microdots 115. Based on these non-uniform light paths, the light emission efficiency is unsatisfactory.

Referring to FIG. 2, each of the conventional microdots 115 often has a plano-convex structure which has a bowl shape or a bowl-like shape, thereby having a curve 116. Therefore, the light reflected by the curve 116 to the light exit surface 114 is of a diffusion type, and hence can be hardly concentrated. Furthermore, since the reflection angle at which light is reflected to the light exit surface 114 by the curve 116 of each of the conventional microdots 115 cannot be adjusted, the emission angle at which light is emitted from the light exit surface 114 can hardly be adjusted, and thus the light utilization rate cannot be improved. In addition, due to the poor light concentration attributed to the conventional microdots 115, the directivity of the light emitted from the light exit surface 114 is unsatisfactory. Accordingly, even if the light guide plate 11 is used in combination with a turning prism sheet, the light emission efficiency can hardly be enhanced sufficiently.

SUMMARY

Therefore, an object of the disclosure is to provide a light guide plate that can alleviate at least one of the drawbacks of the prior art.

In a first aspect, the present disclosure provides a light guide plate that includes a light guide layer and a first microstructure layer. The light guide layer has a light exit surface, a back surface that is opposite to the light exit surface, and a light incidence surface that interconnects the light exit surface and the back surface. The first microstructure layer is disposed on the back surface of the light guide layer, and includes a plurality of first microstructures that are spaced apart from one another. Each of the first microstructures has a polygonal planar base that is disposed on the back surface of the light guide layer and that has two first edges and two second edges respectively proximal and distal to the light incidence surface of the light guide layer, two first inclined faces that respectively extend inclinedly from the first edges of the planar base to each terminate at two terminal sides, and two second inclined faces that respectively extend inclinedly from the two second edges of the planar base to each terminate at two terminal sides. Each of the first inclined faces intersects a respective one of the second inclined faces at a respective one of two first ridges, where one of the two terminal sides of one of the first inclined faces entirely overlaps with one of the two terminal sides of a corresponding one of the second inclined faces. The first inclined faces of each of the first microstructures are arranged along a first direction that is parallel to the light incidence surface of the light guide layer. The second inclined faces of each of the first microstructures are arranged along the first direction. Each of the first inclined faces and the respective intersecting one of said second inclined faces are arranged along a second direction that is perpendicular to the first direction. Each of the first ridges cooperates with the planar base to form a first angle that ranges from 5 to 70 degrees. The other one of the two terminal sides of any one of the first inclined faces, which does not overlap with one of the two terminal sides of the corresponding one of the second inclined faces, cooperates with the planar base to form a second angle. The other one of the two terminal sides of any one of the second inclined faces, which does not overlap with one of the two terminal sides of a corresponding one of the first inclined faces, cooperates with the planar base to form a third angle.

In a second aspect, the present disclosure provides a backlight module that includes the aforesaid light guide plate and a light source for emitting light toward the light incidence surface of the light guide layer of the light guide plate. The light incidence surface of the light guide layer of the light guide plate is disposed to face the light source.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
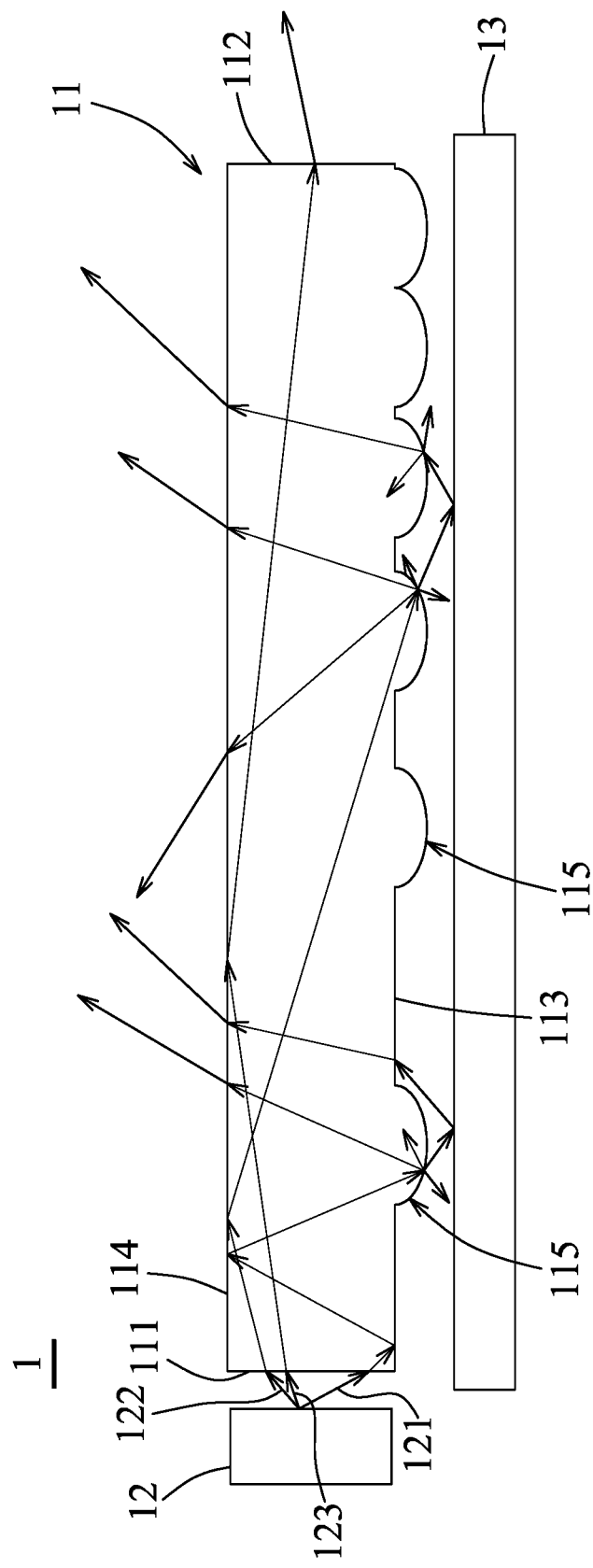
FIG. 1 is a schematic view of a conventional backlight module.
Figure 2:
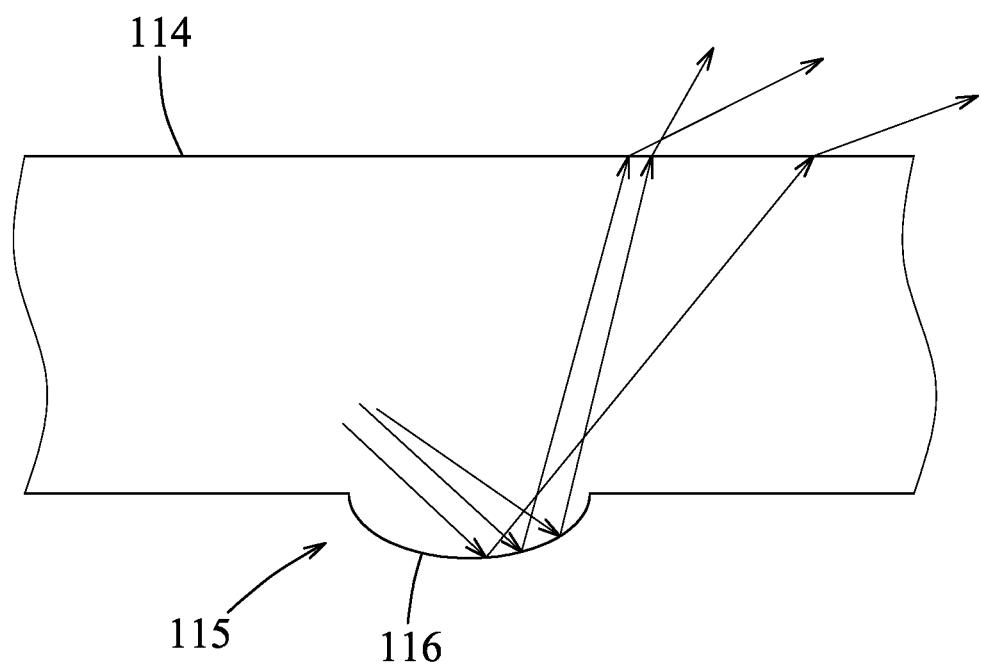
FIG. 2 is a fragmentary, enlarged schematic view of the conventional backlight module.

Before the disclosure is described in greater detail, it should be noted that like elements are denoted by the same reference numerals throughout the disclosure.

Figure 3:
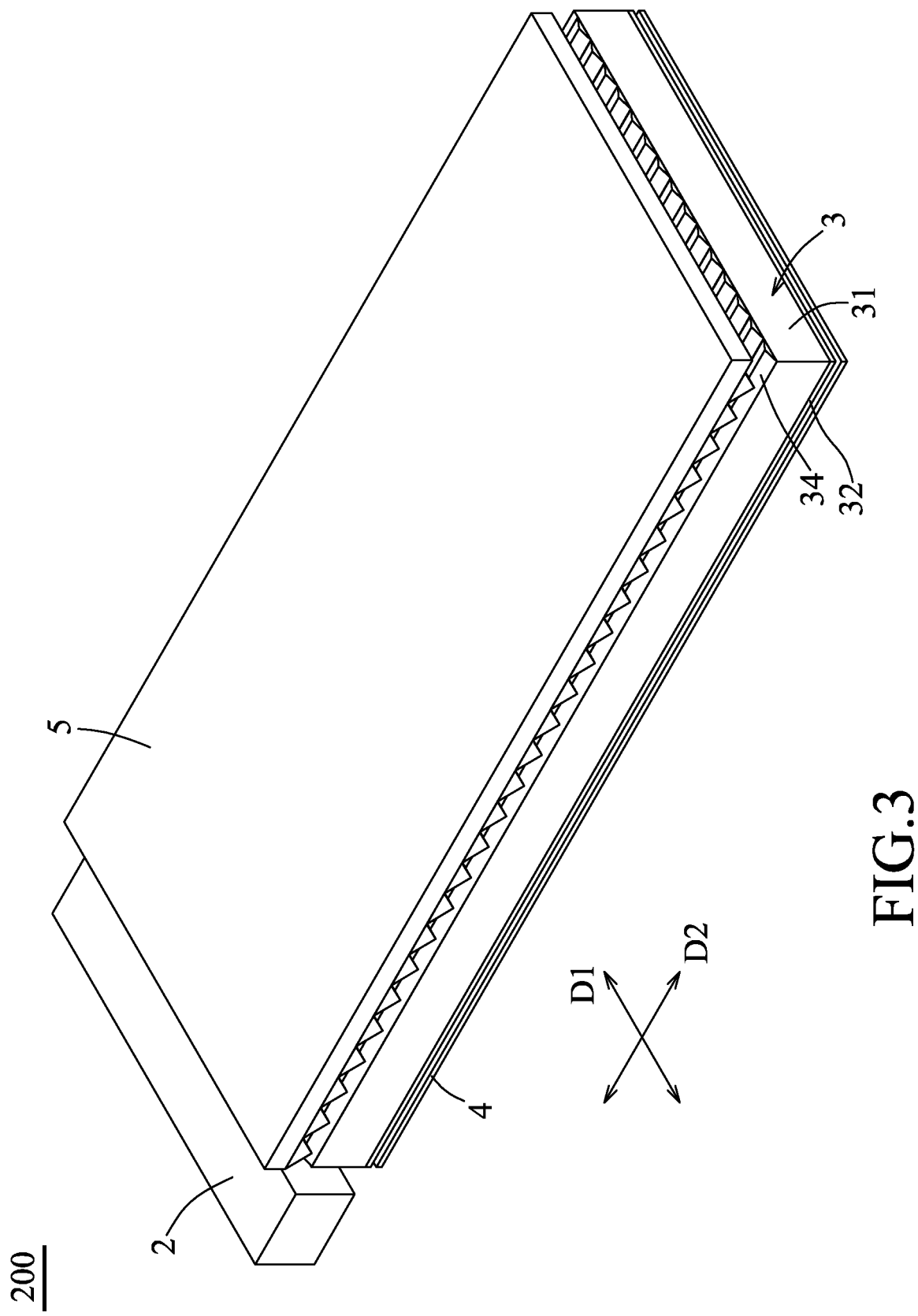
FIG. 3 is perspective view of a backlight module employing a first embodiment of a light guide plate according to the present disclosure.

Referring to FIG. 3, a first embodiment of a light guide plate 3 according to the present disclosure is used as a component of a backlight module 200 for supplying light to a liquid-crystal panel of a liquid-crystal display (LCD) not shown in the drawing. The backlight module 200 may be an edge-type backlight module, and includes, in addition to the light guide plate 3, a light source 2, a light reflection sheet 4, and a prism sheet 5.

Figure 4:
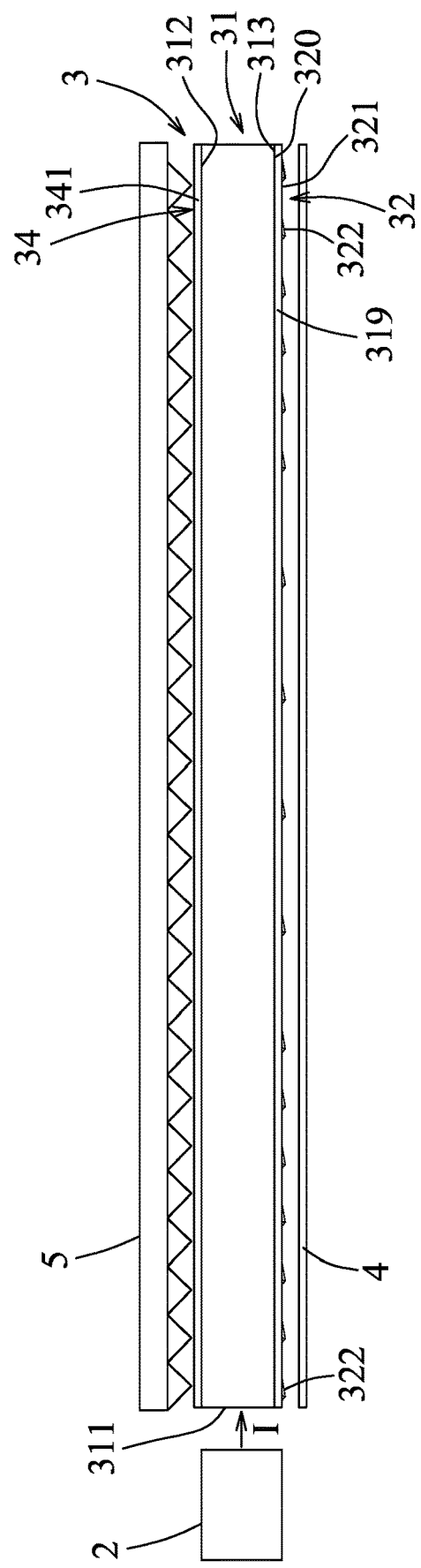
FIG. 4 is a side view of the backlight module employing the first embodiment of the light guide plate.
Figure 5:
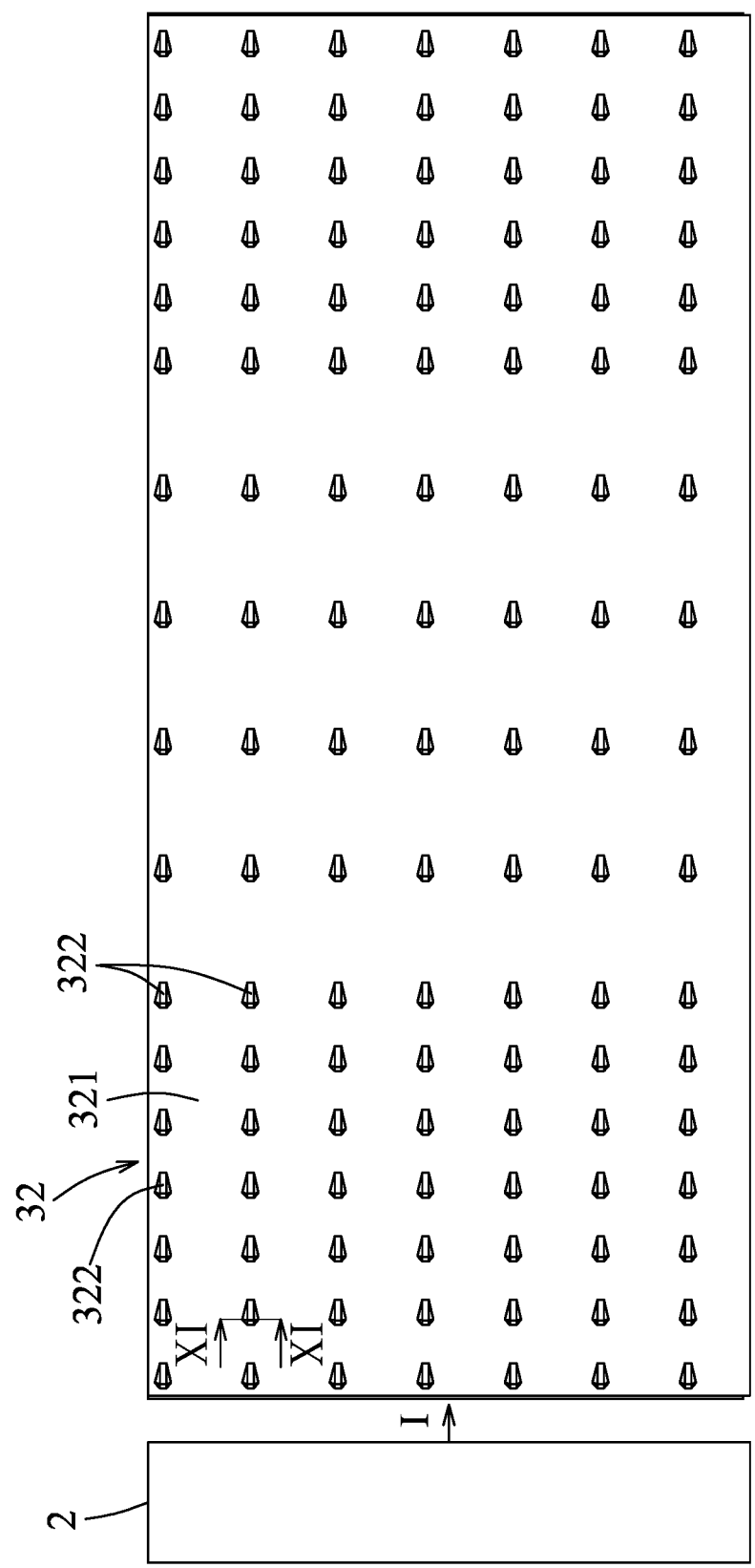
FIG. 5 is a bottom view illustrating the first embodiment of the light guide plate and a light source which are employed in the backlight module.

Referring to FIGS. 4 and 5, the light source 2 may be a light emitting unit including a plurality of light emitting diodes, or a cold-cathode tube. The light source 2 emits light toward one side of the light guide plate 3, for instance, in a horizontal direction indicated by Arrow I (please note that such arrow is just for illustrating that the light emitted by the light source 2 can travel toward the one side of the light guide plate 3 in the horizontal direction, and that the light emitted by the light source 2 may also travel in directions different from the horizontal direction, e.g. in the directions shown in FIGS. 10 and 12, as long as the emitted light travels toward the one side of the light guide plate 3).

The light guide plate 3 includes a light guide layer 31, a first microstructure layer 32, and a second microstructure layer 34.

The light guide layer 31 may be a flexible transparent film made from a transparent material such as polycarbonate (PC) or poly (methyl methacrylate) (PMMA). The light guide layer 31 extends in a longitudinal direction, and has a light exit surface 312 that extends in the longitudinal direction, a back surface 313 that extends in the longitudinal direction and is opposite to the light exit surface 312, and a light incidence surface 311 that extends in a direction transverse to the longitudinal direction and interconnects the light exit surface 312 and the back surface 313. The light incidence surface 311 is disposed to face the light source 2 and is spaced apart from the light source 2.

The first microstructure layer 32 is disposed on the back surface 313 of the light guide layer 31, and includes a planar connecting portion 319 and a plurality of first microstructures 322. The planar connecting portion 319 extends in the longitudinal direction, and has a connecting face 320 which is connected to the back surface 313 of the light guide layer 31, and a loading face 321 which is opposite to the connecting face 320 and from which the first microstructures 322 protrude. The first microstructures 322 are arranged in an array and are spaced apart from one another. In this embodiment, the first microstructure layer 32 is formed on the back surface 313 of the light guide layer 31 through a coating and curing process. Specifically, a transparent ultraviolet (UV) curable adhesive is coated on the back surface 313 of the light guide layer 31, and then is cured by UV light irradiated from a UV lamp so as to form a transparent layer serving as the first microstructure layer 32.

Figure 6:
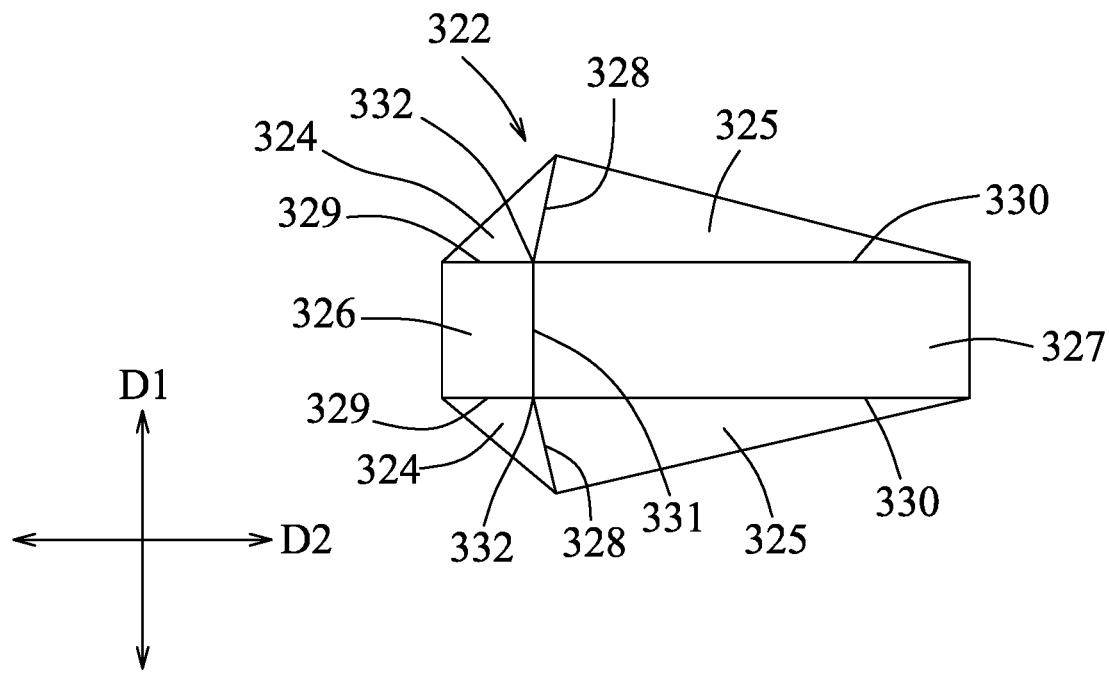
FIG. 6 is a bottom view illustrating one of first microstructures of the first embodiment of the light guide plate.
Figure 7:
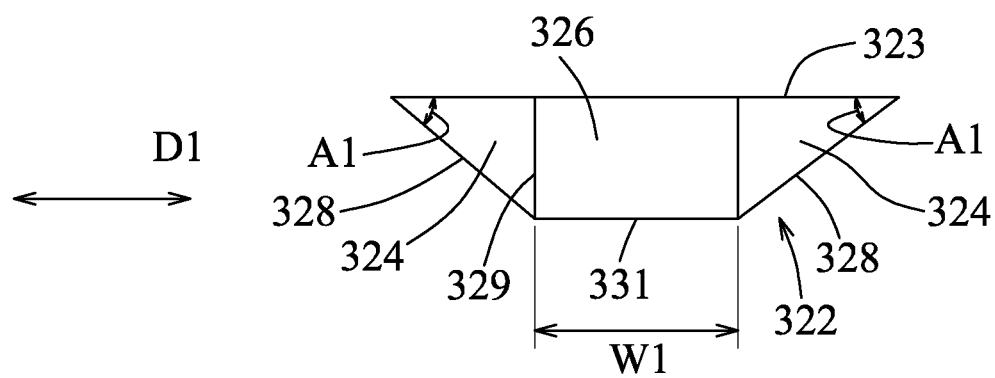
FIG. 7 is a schematic side view illustrating that one of the first microstructures of the first embodiment of the light guide plate has a first angle.
Figure 8:
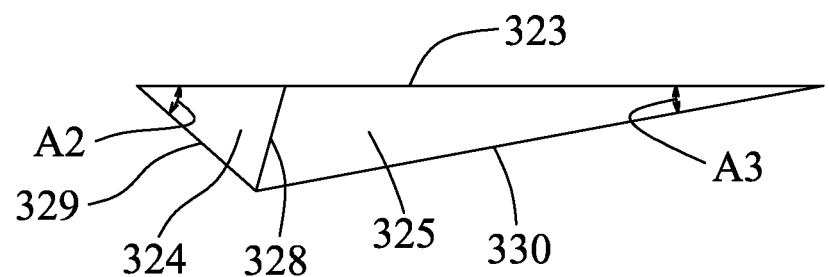
FIG. 8 is a schematic side view illustrating that one of the first microstructures of the first embodiment of the light guide plate has a second angle and a third angle.

Referring to FIGS. 4, 6, and 7, each of the first microstructures 322 has a polygonal planar base 323, two first inclined faces 324, two second inclined faces 325, a third inclined face 326, a fourth inclined face 327, two first ridges 328, two second ridges 329, two third ridges 330, and a fourth ridge 331. The planar base 323 is connected to the loading face 321 and is hexagonal in this embodiment. The planar base 323 has two first edges and two second edges that are respectively proximal and distal to the light incidence surface 311 of the light guide layer 31, a third edge that interconnects the first edges, and a fourth edge that interconnects the second edges.

The two first inclined faces 324 respectively extend inclinedly from the two first edges of the planar base 323 to each terminate at two terminal sides, and are arranged along a first direction (D1) that is parallel to the light incidence surface 311 of the light guide layer 31. The two second inclined faces 325 respectively extend inclinedly from the two second edges of the planar base 323 to each terminate at two terminal sides, and are arranged along the first direction (D1). Each of the first inclined faces 324 intersect a respective one of the second inclined faces 325 at a respective one of the first ridges 328 where one of the two terminal sides of one of the first inclined faces 324 entirely overlaps with one of the two terminal sides of a corresponding one of the second inclined faces 325. The other one of the two terminal sides of any one of the first inclined faces 324, which does not overlap with one of the two terminal sides of the corresponding one of the second inclined faces 325, entirely overlaps with the respective one of the second ridges 329. Each of the first inclined faces 324 and the respective intersecting one of the second inclined faces 325 are arranged along a second direction (D2) that is perpendicular to the first direction (D1). Each of the first and second inclined faces 324, 325 is triangular.

The third inclined face 326 extends inclinedly from the third edge of the planar base 323 to intersect each of the first inclined faces 324 at a respective one of the two second ridges 329 (i.e., the third inclined face 326 interconnects the two first inclined faces 324). The fourth inclined face 327 extends inclinedly from the fourth edge of the planar base 323 to intersect the third inclined face 326 at the fourth ridge 331 and to intersect each of the second inclined faces 325 at a respective one of the two third ridges 330 (i.e., the fourth inclined face 327 interconnects the two second inclined faces 325 and is connected to the third inclined face 326). The other one of the two terminal sides of any one of the second inclined faces 325, which does not overlap with one of the two terminal sides of the corresponding one of the first inclined faces 324, entirely overlaps with the respective one of the third ridges 330. Each of the third and fourth inclined faces 326, 327 is rectangular.

Referring to FIGS. 5 to 8, each of the first ridges 328 cooperates with the planar base 323 to form a first angle (A1). By setting the first angle (A1), it is feasible to control angles at which light beam components traveling in the first direction (D1) (i.e. traveling perpendicular to the horizontal direction indicated by Arrow I or parallel to the light incidence surface 311) are reflected by the first inclined faces 324 and the second inclined faces 325, such that it is feasible to control at what angle the light beam components are concentrated. In other words, the angle of light concentration and the degree of light concentration can be adjusted by adjusting the first angle (A1). The first angle (A1) may range from 5 to 70 degrees. In certain embodiments, the first angle (A1) ranges from 10 to 60 degrees. In other embodiments, the first angle (A1) is 35 degrees. In this embodiment, the first angle (A1) is 20 degrees.

Figure 12:
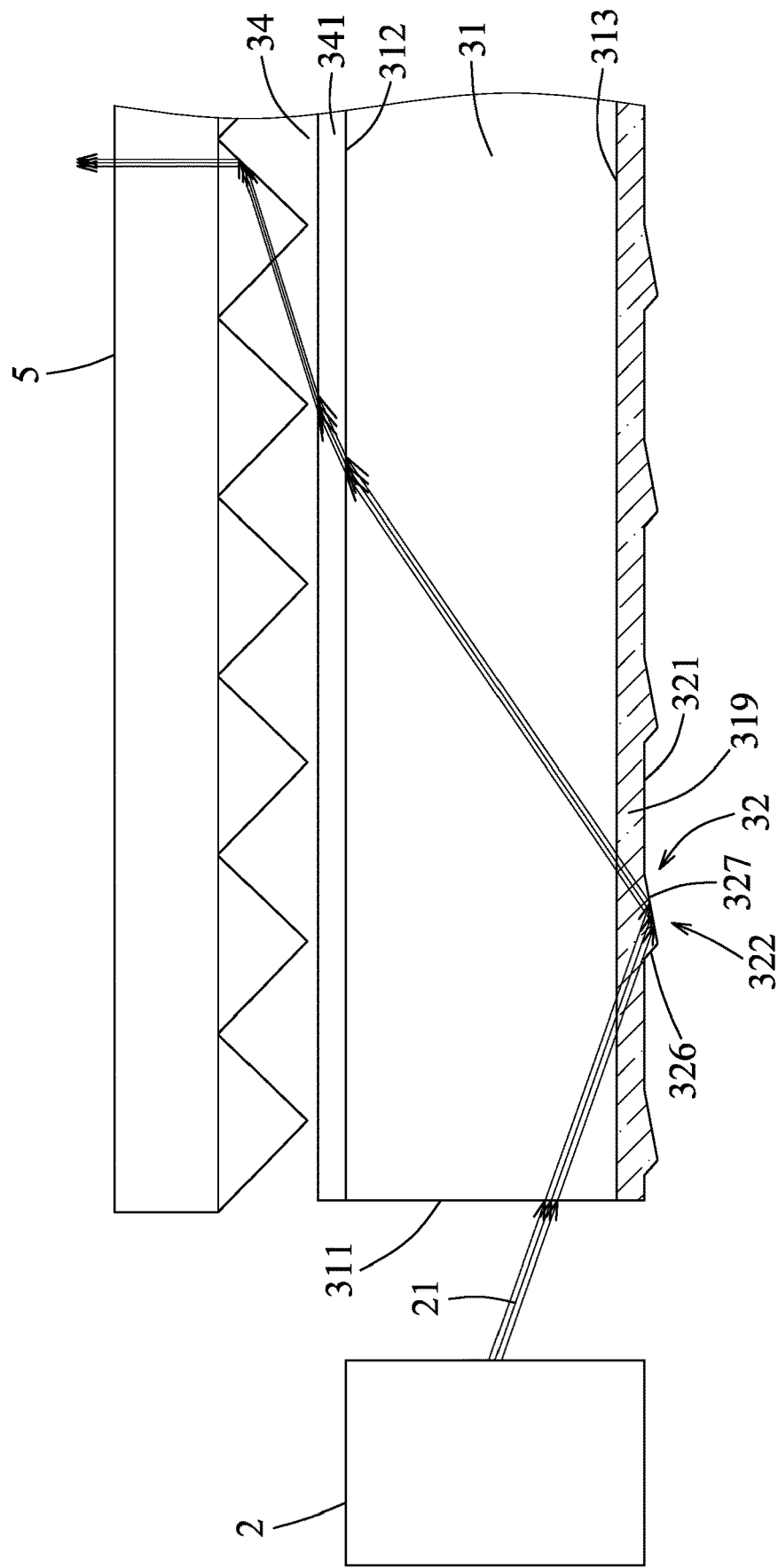
FIG. 12 is a fragmentary enlarged view illustrating the detailed path of a light beam as shown in FIG. 10.

In addition, as shown in FIG. 12, since light beams from the light source 2 can be controlled by virtue of the first microstructures 322 to exit the light guide plate 3 substantially at the same angle when the first angle (A1) is within an optimal range as mentioned above, the light beams from the light source 2 can exit the prism sheet 5 substantially only in a direction perpendicular to the first direction (D1) (i.e. not in other direction such as a direction perpendicular to the second direction (D2)). Therefore, light uniformity can be enhanced and light collection can be rendered easier.

The other one of the two terminal sides of any one of the first inclined faces 324, which does not overlap with one of the two terminal sides of the corresponding one of the second inclined faces 325, cooperates with the planar base 323 to form a second angle (A2). In this embodiment, the other one of the two terminal sides of any one of the first inclined faces 324, which does not overlap with one of the two terminal sides of the corresponding one of the second inclined faces 325, entirely overlaps with the respective one of the second ridges 329. In other words, each of the second ridges 329 forms the second angle (A2) with the planar base 323. By setting the second angle (A2), it is feasible to control angles at which light beam components traveling in the second direction (D2) (i.e. traveling parallel to the horizontal direction indicated by Arrow I or perpendicular to the light incidence surface 311) are reflected by the first inclined faces 324, the second inclined faces 325, and the third inclined face 326, such that it is feasible to control at what angle the light beam components exit. Namely, at what angle light exit occurs can be adjusted by adjusting the second angle (A2). The second angle (A2) may range from 30 to 89 degrees. In certain embodiments, the second angle (A2) ranges from 30 to 50 degrees. In other embodiments, the second angle (A2) is 45 degrees. In this embodiment, the second angle (A2) is 30 degrees. It should be noted that the larger the second angle (A2), the more concentrated exiting light beams are.

The other one of the two terminal sides of any one of the second inclined faces 325, which does not overlap with one of the two terminal sides of a corresponding one of the first inclined faces 324, cooperates with the planar base 323 to form a third angle (A3). In this embodiment, the other one of the two terminal sides of any one of the second inclined faces 325, which does not overlap with one of the two terminal sides of the corresponding one of the first inclined faces 324, entirely overlaps with the respective one of the third ridges 330. In other words, each of the third ridges 330 forms the third angle (A3) with the planar base 323. By setting the third angle (A3), it is feasible to control angles at which light beam components traveling in the second direction (D2) (i.e. traveling parallel to the horizontal direction indicated by Arrow I or perpendicular to the light incidence surface 311) are reflected by the first inclined faces 324, the second inclined faces 325, and the fourth inclined faces 327, such that it is feasible to control at what angle the light beam components exit. Namely, at what angle light exit occurs can be adjusted by adjusting the third angle (A3). The third angle (A3) may range from 1 to 10 degrees. In certain embodiments, the third angle (A3) ranges from 1.2 to 5 degrees. In other embodiments, the third angle (A3) is 1.2 degrees. In this embodiment, the third angle (A3) is 3 degrees. It should be noted that the smaller the third angle (A3), the more concentrated exiting light beams are.

Further by virtue of the second and third angles (A2, A3) set to be within an optimal range as mentioned above, light beams from the light source 2 can be more easily controlled to exit the light guide plate 3 substantially at the same angle, such that the light beams from the light source 2 can exit the prism sheet 5 substantially only in a direction perpendicular to the first direction (D1) (i.e. not in other direction such as a direction perpendicular to the second direction (D2)). Therefore, light uniformity can be further enhanced and light collection can be further rendered easier.

The fourth ridge 331 extends in the first direction (D1) and parallel to the light incidence surface 311 to terminate at two opposite terminal ends 332. Each of the terminal ends 332 interconnects a respective one of the first ridges 328, a respective one of the second ridges 329, and a respective one of the third ridges 330. The fourth inclined face 327 has a first width (W1) which is equal in length to the fourth ridge 331, and which is also equal in length to a length of the second inclined face 326. The first width (W1) may range from 1 μm to 30 μm. In certain embodiments, the first width (W1) ranges from 1 μm to 20 μm. In this embodiment, the first width (W1) is 10 μm. It should be noted that the smaller the first width (W1), the better the effect of light convergence attributing to light reflection by the first and second inclined faces 324,325 is. Specifically, when the first width (W1) becomes smaller, the length of each of the first ridges 328 becomes larger, such that the area of each of the first and second inclined faces 324, 325 is increased (such increase in the area enhances the effect of light convergence attributing to light reflection by the first and second inclined faces 324,325). In spite of the aforesaid intended design of the first width (W1), it should be noted that the intended decrease in the first width (W1) should be carefully controlled in certain situations to prevent undesired negative effects.

Figure 9:
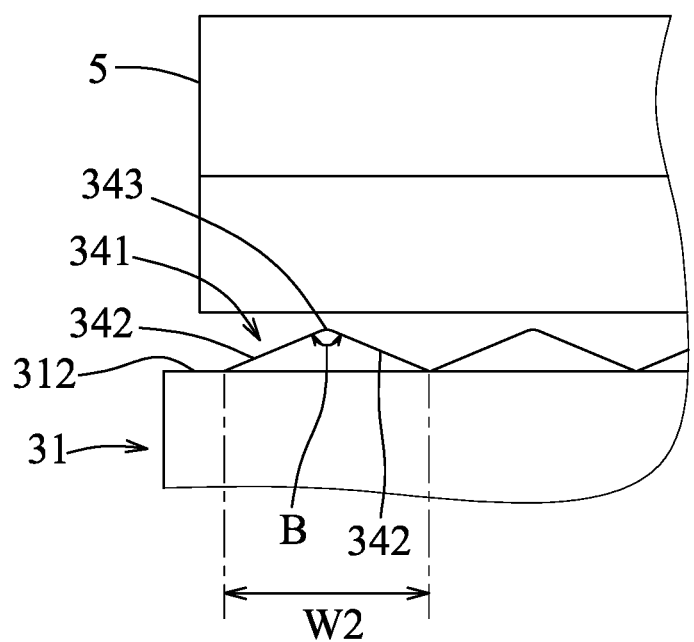
FIG. 9 is a fragmentary enlarged schematic view illustrating that each of second microstructures of the first embodiment of the light guide plate has two beveled faces interconnected by a fillet.

Referring to FIGS. 3, 4, and 9, the second microstructure layer 34 is disposed on the light exit surface 312 of the light guide layer 31 and has repetitive units. In this embodiment, the second microstructure layer 34 is formed on the light exit surface 312 of the light guide layer 31 through a coating and curing process. Specifically, a transparent UV curable adhesive is coated on the light exit surface 312 of the light guide layer 31, and then is cured by UV light irradiated from a UV lamp so as to form a transparent layer serving as the second microstructure layer 34. The second microstructure layer 34 includes a plurality of second microstructures 341 arranged in the first direction (D1), namely the aforesaid repetitive units. Each of the second microstructures 341 extends longitudinally in the second direction (D2) and is a prism. Each of the second microstructures 341 has a base that is disposed on the light exit surface 312 of the light guide layer 31 and has two opposite longitudinal edges, two beveled faces 342 that extend inclinedly respectively from the longitudinal edges of the base by the same distance, and a fillet 343 that interconnects the beveled faces 342. The beveled faces 342 cooperate to form a vertex angle (B), which is designed to correlate with the first, second, and third angles (A1, A2, A3) of the first microstructures 322. The vertex angle (B) may be larger than 50 degrees and smaller than 150 degrees. In this embodiment, the vertex angle (B) is 120 degrees. The fillet 343 has a radius that may be not smaller than 3 μm and may be smaller than 20 μm. In this embodiment, the radius of the fillet 343 is 3 μm. It should be noted that the smaller the radius of the fillet 343, the better the effect of light convergence. The base of each of the second microstructures 341 has a second width (W2) which is equal in length to a distance between the longitudinal edges and which may range from 10 μm to 50 μm. In this embodiment, the second width (W2) is 12 μm. It should be noted that the smaller the second width (W2), less likely the Moire effect is to be induced on the backlight module 200.

By virtue of the process of forming the first and second microstructure layers 32 and 34 respectively on the back surface 313 and the light exit surface 312 of the light guide layer 31 employed in this embodiment, i.e. the coating and curing process, the overall thickness of the light guide plate 3 can be effectively reduced for the purpose of thinning. Therefore, in contrast with conventional light guide plates formed by injection molding, the light guide plate 3 of the present disclosure is not limited to certain sizes. Furthermore, the type of the transparent UV curable adhesive for forming the first and second microstructure layers 32, 34 may vary according to the actual need. In the case that an elastic soft adhesive is used as the transparent UV curable adhesive, the first and second microstructure layers 32, 34 thus formed can maintain their structural integrity when subjected to friction by an external force, being able to restore its original state under the influence of the external force. In the case that a hard adhesive having a pencil hardness greater than H is used as the transparent UV curable adhesive, the first and second microstructure layers 32, 34 thus formed can protect the light guide layer 31 so as to prevent the same from being scratched and further damaged.

Referring to FIGS. 3 and 4, the reflection sheet 4 extends in the longitudinal direction, and is disposed to face and be spaced apart from the first microstructure layer 32. The prism sheet 5 extends in the longitudinal direction, and is disposed to face and be spaced apart from the second microstructure layer 34. In this embodiment, the prism sheet 5 is a reverse prism sheet.

Figure 10:
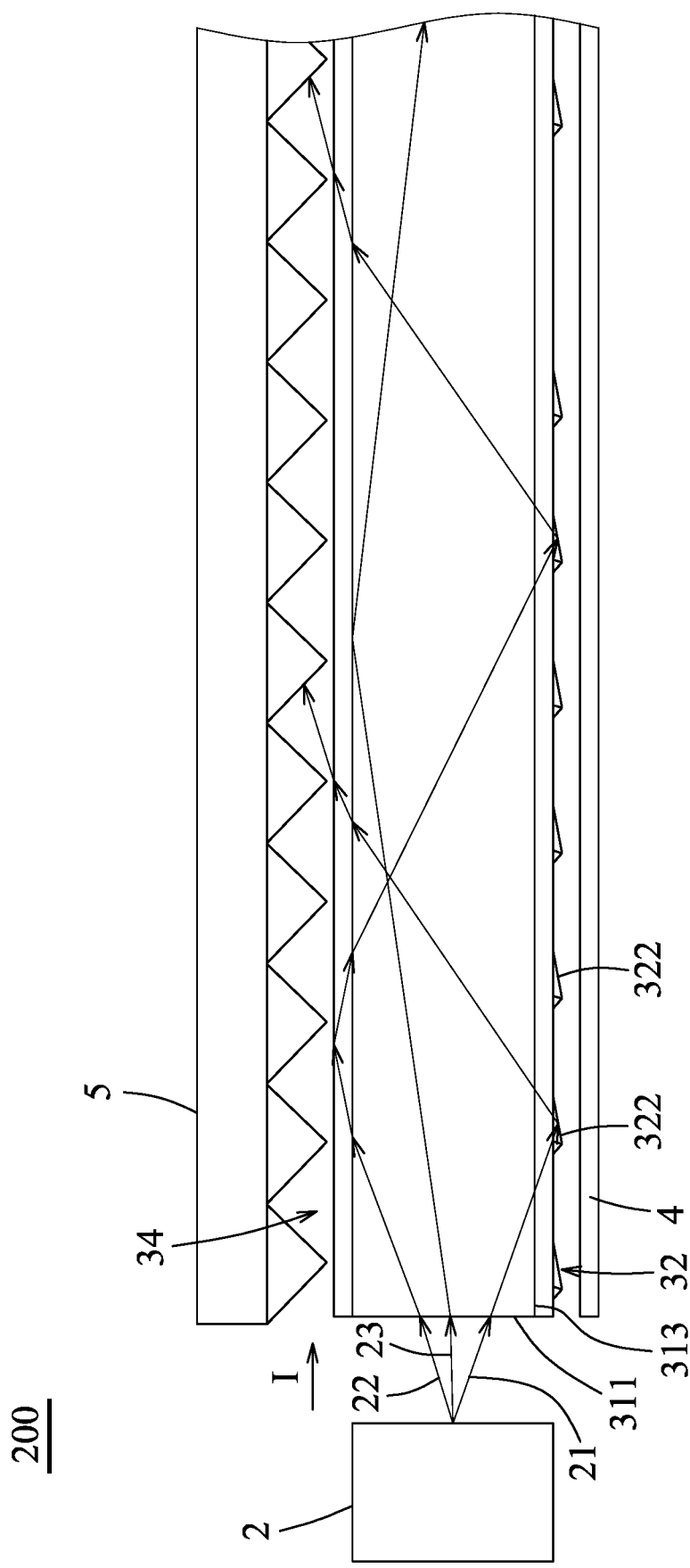
FIG. 10 is a fragmentary view illustrating how light beams emitted from the light source are transmitted in the first embodiment of the light guide plate.

Referring to FIG. 10, paths of several light beams emitted from the light source 2 toward and into the light incidence surface 311 of the light guide layer 31 are illustrated. A light beam 21 which is emitted from the light source 2 at a relatively large angle has a higher chance of undergoing total reflection after entering the light guide layer 31, thereby being able to reach one of the first microstructures 322 adjacent to the light incidence surface 311 (see FIG. 12 for more detail of the light beam 21). A light beam 22 which is emitted from the light source 2 at a relatively small angle normally reaches one of the first microstructures 322 away from the light incidence surface 311. A light beam 23, which is emitted from the light source 2 and enters the light incidence surface 311 at an angle of nearly 90 degrees, has a much less chance of undergoing total reflection after entering the light guide layer 31 compared to the other two light beams, thereby being likely not to reach one of the first microstructures 322 and to be emitted out of the light guide layer 31 through a lateral surface opposite to the light incidence surface 311. The light beams 21, 22, after entering one of the first microstructures 322 through the back surface 313, are reflected by the second, third, and fourth inclined faces 325, 326, 327 of the corresponding one of the first microstructures 322 to the light exit surface 312. Few of the light beam components reflected to the light exit surface 312 are reflected by the light exit surface 312 back to the first microstructure layer 32 or to the reflection sheet 4 so as to be reflected toward the light exit surface 312 again (the reflection from the reflection sheet 4 is not shown in FIG. 10). After the reflection of the light beams 21, 22 back to the light guide layer 31, the light beams 21, 22 enter the second microstructure layer 34 through the light exit surface 312, and further enter the prism sheet 5 through the second microstructure layer 34.

Figure 11:
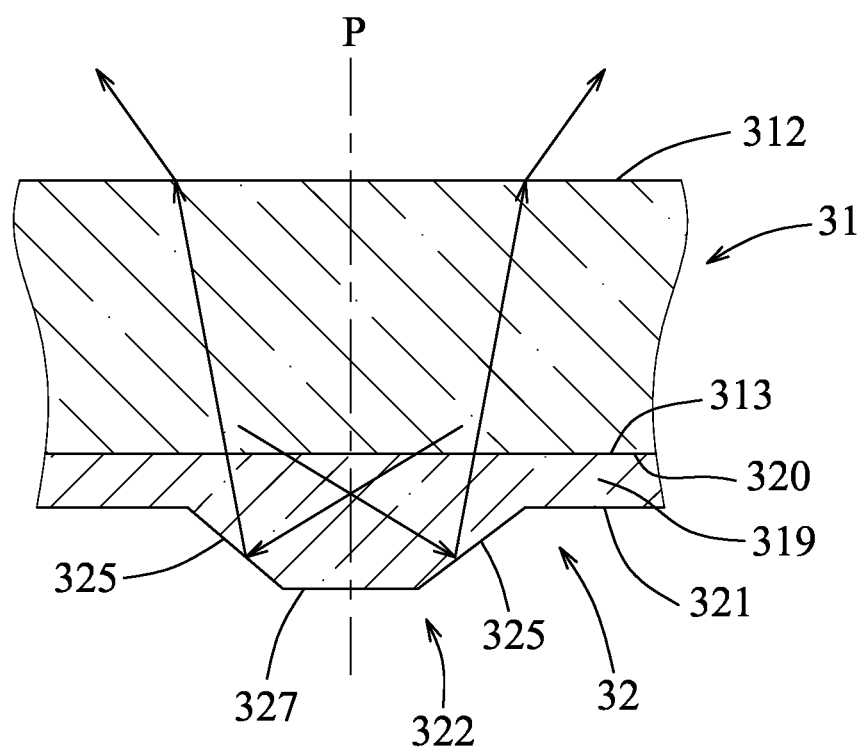
FIG. 11 is a fragmentary, schematic sectional view taken along line XI-XI in FIG. 5 and illustrating how light beam components traveling in a first direction as shown in FIG. 6 are transmitted in one of the first microstructures of the first embodiment of the light guide plate, in which only the one of the first microstructures is shown.

Referring to FIG. 11, more light paths are illustrated. Specifically, paths of light beam components traveling in the first direction (D1) (i.e. traveling perpendicular to the horizontal direction indicated by Arrow I) are shown.

When light is transmitted to the third inclined face 326 of one of the first microstructure 322, the light is totally reflected by the third inclined face 326 to one of the first inclined faces 324, one of the second inclined faces 325, or the fourth inclined face 327, such that the one of the first inclined faces 324, the one of the second inclined faces 325, or the fourth inclined face 327 can further reflect or refract the light. When light beam components traveling in the first direction (D1) (i.e. traveling perpendicular to the horizontal direction indicated by Arrow I) reach the two first inclined faces 324 and the two second inclined faces 325, these inclined faces reflect the light beam components (see FIG. 11 for the reflection by the two second inclined faces 325) to concentrate the light beam components on the back surface 313 of the light guide layer 31 at angles that can render the light beam components proximal to an imaginary central plane (P) of the planar base 323 intersecting the midpoints of the third and fourth edges, after which the light beam components travel out of the light exit surface 312 of the light guide layer 31. Moreover, when light beam components traveling in the second direction (D2) (i.e. traveling parallel to the horizontal direction indicated by Arrow I) reach the two first inclined faces 324, the two second inclined faces 325, and the fourth inclined face 327, these inclined faces reflect the light beam components to the light exit surface 312, after which the light beam components travel out of the light exit surface 312. Since at what angle light beam components traveling in the first direction (D1) are concentrated can be adjusted by adjusting the first angle (A1), and since at what angle light beam components traveling in the second direction (D2) exit can be adjusted by adjusting the second and third angles (A2, A3), a high degree of light collimation can be achieved on the light exit surface 312. In addition, the concentration effect of light beams transmitted through the light exit surface 312 can be controlled by adjusting the vertex angle (B) of each of the second microstructures 341, such that the degree of light collimation and the light directivity on the second microstructure layer 34 can be further enhanced.

Since the prism sheet 5 is a reverse prism sheet which changes where and at what angle light exits through total reflection, the extraction efficiency of light transmitted from the second microstructure layer 34 to the prism sheet 5 can be further enhanced via reflection by the prism sheet 5. Specifically, since light beams from the light source 2 can be controlled by virtue of the first microstructures 322 to travel substantially in the same predetermined path and hence exit the second microstructure layer 34 substantially at the same angle (see FIG. 10), the light beams from the light source 2 can be further controlled by virtue of the prism sheet 5 to exit substantially in the same direction, thereby preventing non-uniformity of light emission and further enhancing light collimation.

Referring back to FIG. 5, when the third angle (A3) is required to be small, the path of a light beam traveling in the light guide plate 3 can be adjusted by the first microstructures 322 for certain times so as to be transmitted out of the light exit surface 312 of the light guide layer 31. Therefore, in this embodiment, a distribution density of the first microstructures 322 is designed to vary along the second direction (D2) away from the light incidence surface 311 of the light guide layer 31 in such a manner that a first group of the first microstructures 322 disposed most proximal to the light incidence surface 311 and a second group of the first microstructures 322 disposed most distal to the light incidence surface 311 are distributed at a higher density compared to a third group of the first microstructures 322 disposed between the first and second groups. Based on such relatively high density of distribution proximal to the light incidence surface 311, where and at what angle a light beam exits can be adjusted in a satisfactorily short distance so as to increase the light uniformity to, for example, more than 80%. The first microstructures 322, when the third angle (A3) thereof becomes smaller, can achieve a higher degree of light collimation further via the prism sheet 5.

Figure 13:
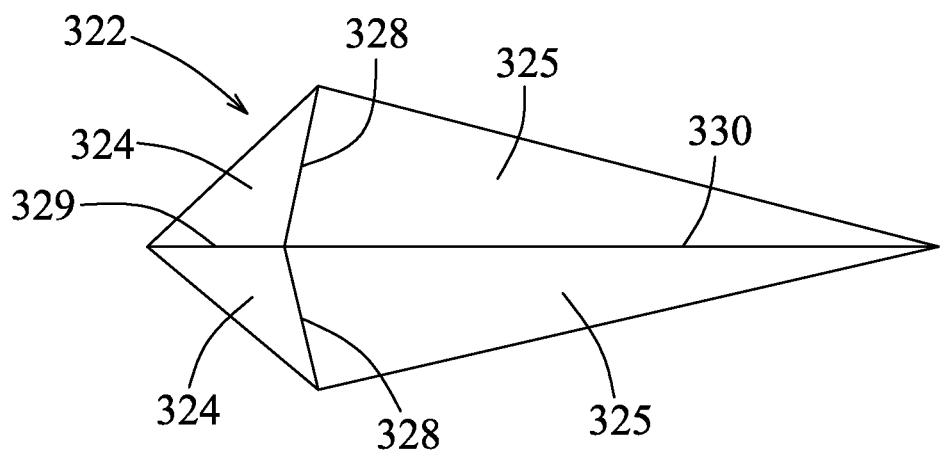
FIG. 13 is a bottom view illustrating one of the first microstructures of a second embodiment of the light guide plate according to the present disclosure.

Referring to FIG. 13, a second embodiment of the light guide plate 3 according to the present disclosure is illustrated, and is structurally similar to the first embodiment, except that the first microstructures 322 have less inclined faces in the second embodiment.

Specifically, in the second embodiment, the first inclined faces 324 intersect with each other at a second ridge 329 (i.e. the third inclined face 326 and the third edge of the first embodiment as shown in FIG. 6 are dispensed with), and the second inclined faces 325 intersect with each other at a third ridge 330 (i.e. the fourth inclined face 327 and the fourth edge of the first embodiment as shown in FIG. 6 are dispensed with). The other one of the two terminal sides of any one of the first inclined faces 324, which does not overlap with one of the two terminal sides of the corresponding one of the second inclined faces 325, entirely overlaps with the second ridge 329. The other one of the two terminal sides of any one of the second inclined faces 325, which does not overlap with one of the two terminal sides of the corresponding one of the first inclined faces 324, entirely overlaps with the third ridge 330. The two first ridges 328, the second ridge 329, and the third ridge 330 are connected with each other at an apex (i.e. the fourth ridge 331 of the first embodiment as shown in FIG. 6 is dispensed with), such that each of the first microstructures 322 is a tetrahedron. Likewise, where and at what angle light beam components traveling in the first direction (D1) are concentrated can be adjusted by adjusting the first angle (A1), and where and at what angle light beam components traveling in the second direction (D2) exit can be adjusted by adjusting the second and third angles (A2, A3).

Figure 14:
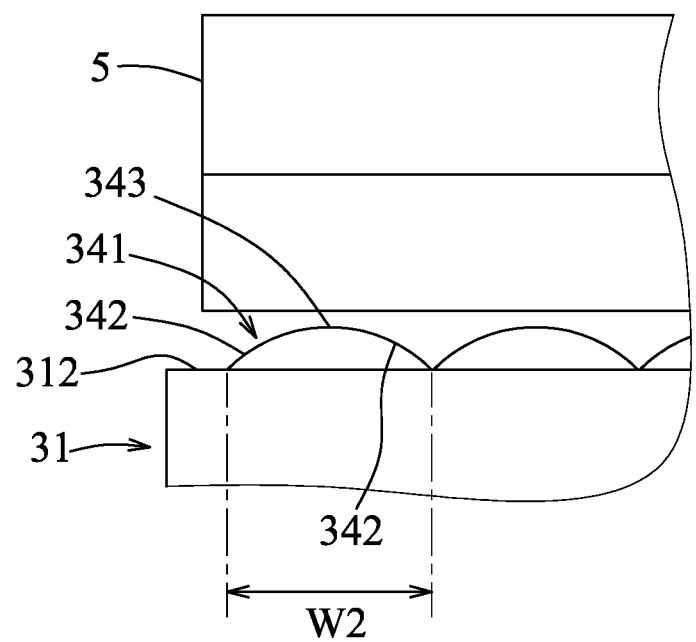
FIG. 14 a fragmentary enlarged schematic view illustrating that each of the second microstructures of a third embodiment of the light guide plate has two curved surfaces interconnected by the fillet.

Referring to FIG. 14, a third embodiment of the light guide plate 3 according to the present disclosure is illustrated, and is structurally similar to the first embodiment, except that the second microstructures 341 are modified in the second embodiment.

Specifically, in the third embodiment, each of the second microstructures 341 has two curved faces 342 that extend curvedly respectively from the longitudinal edges of the base, and the fillet 343 that interconnects the curved faces 342. The fillet 343 has a radius that may be larger than 5 μm and smaller than 500 μm. In the third embodiment, the radius of the fillet 343 is 12 μm. It should be noted that the smaller the radius of the fillet 343, the better the haze and shielding effect of the backlight module 200 is.

The second width (W2) of each of the second microstructures 341 may range from 2 μm to 100 μm. In the third embodiment, the second width (W2) is 12 μm. Likewise, the smaller the second width (W2), less likely the Moire effect is to be induced on the backlight module 200.

In view of the aforesaid advantages of the light guide plate 3 of the present disclosure, the light emission efficiency of a backlight module employing the light guide plate 3 of the present disclosure is satisfactory. Moreover, the light guide plate 3 of the present disclosure can achieve a higher degree of light collimation via the prism sheet 5.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A light guide plate comprising:
   a light guide layer having a light exit surface, a back surface that is opposite to said light exit surface, and a light incidence surface that interconnects said light exit surface and said back surface; and
   a first microstructure layer disposed on said back surface of said light guide layer and including a plurality of first microstructures that are spaced apart from one another, each of said first microstructures having a polygonal planar base that is disposed on said back surface of said light guide layer and that has two first edges and two second edges respectively proximal and distal to said light incidence surface of said light guide layer, two first inclined faces that respectively extend inclinedly from said two first edges of said polygonal planar base to each terminate at two terminal sides, and two second inclined faces that respectively extend inclinedly from said two second edges of said polygonal planar base to each terminate at two terminal sides, each of said first inclined faces intersecting a respective one of said second inclined faces at a respective one of two first ridges where one of said two terminal sides of one of said first inclined faces entirely overlaps with one of said two terminal sides of a corresponding one of said second inclined faces, said first inclined faces of each of said first microstructures being arranged along a first direction that is parallel to said light incidence surface of said light guide layer, said second inclined faces of each of said first microstructures being arranged along the first direction, each of said first inclined faces and the respective intersecting one of said second inclined faces being arranged along a second direction that is perpendicular to the first direction, each of said first ridges cooperating with said polygonal planar base to form a first angle that ranges from 5 to 70 degrees, the other one of said two terminal sides of any one of said first inclined faces which does not overlap with one of said two terminal sides of the corresponding one of said second inclined faces cooperating with said polygonal planar base to form a second angle, the other one of said two terminal sides of any one of said second inclined faces which does not overlap with one of said two terminal sides of a corresponding one of said first inclined faces cooperating with said polygonal planar base to form a third angle.

2. The light guide plate as claimed in claim 1, wherein said second angle ranges from 30 to 89 degrees, and said third angle ranges from 1 to 10 degrees.

3. The light guide plate as claimed in claim 1, wherein said first angle ranges from 10 to 60 degrees, said second angle ranges from 30 to 50 degrees, and said third angle ranges from 1.2 to 5 degrees.

4. The light guide plate as claimed in claim 3, wherein said first angle is 35 degrees, said second angle is 45 degrees, and said third angle is 1.2 degrees.

5. The light guide plate as claimed in claim 2, wherein a distribution density of said first microstructures varies along the second direction away from said light incidence surface in such a manner that a first group of said first microstructures disposed most proximal to said light incidence surface and a second group of said first microstructures disposed most distal to said light incidence surface are distributed at a higher density compared to a third group of said first microstructures disposed between the first and second groups.

6. The light guide plate as claimed in claim 1, wherein said polygonal planar base of each of said first microstructures further has a third edge that interconnects said first edges, and a fourth edge that interconnects said second edges, each of said first microstructures further having a third inclined face that extends inclinedly from said third edge to intersect each of said first inclined faces at a respective one of two second ridges, and a fourth inclined face that extends inclinedly from said fourth edge to intersect said third inclined face at a fourth ridge and to intersect each of said second inclined faces at a respective one of two third ridges, the other one of said two terminal sides of any one of said first inclined faces which does not overlap with one of said two terminal sides of the corresponding one of said second inclined faces entirely overlapping with the respective one of said second ridges, the other one of said two terminal sides of any one of said second inclined faces which does not overlap with one of said two terminal sides of the corresponding one of said first inclined faces entirely overlapping with the respective one of said third ridges.

7. The light guide plate as claimed in claim 6, said fourth ridge extends in the first direction and parallel to said light incidence surface to terminate at two opposite terminal ends, each of which interconnects a respective one of said first ridges, a respective one of said second ridges, and a respective one of said third ridges, said fourth inclined face having a first width which is equal in length to said fourth ridge and which ranges from 1 µm to 30 µm.

8. The light guide plate as claimed in claim 1, wherein said first inclined faces intersecting with each other at a second ridge, said second inclined faces intersecting with each other at a third ridge, said two first ridges, said second ridge, and said third ridge being connected with each other at an apex, the other one of said two terminal sides of any one of said first inclined faces which does not overlap with one of said two terminal sides of the corresponding one of said second inclined faces entirely overlapping with said second ridge, the other one of said two terminal sides of any one of said second inclined faces which does not overlap with one of said two terminal sides of the corresponding one of said first inclined faces entirely overlapping with said third ridge.

9. The light guide plate as claimed in claim 1, further comprising a second microstructure layer that is disposed on said light exit surface of said light guide layer, and that includes a plurality of second microstructures arranged in the first direction, each of said second microstructures extending longitudinally in the second direction and being a prism, each of said second microstructures having a base that is disposed on said light exit surface of said light guide layer and has two opposite longitudinal edges, two beveled faces that extend inclinedly respectively from said longitudinal edges of said base, and a fillet that interconnects said beveled faces, said beveled faces cooperating to form a vertex angle that is larger than 50 degrees and smaller than 150 degrees, said fillet having a radius that is not smaller than 3 µm and is smaller than 20 µm, said base of each of said second microstructures having a second width which is equal in length to a distance between said longitudinal edges and which ranges from 10 µm to 50 µm.

10. The light guide plate as claimed in claim 1, further comprising a second microstructure layer that is disposed on said light exit surface of said light guide layer, and that includes a plurality of second microstructures arranged in the first direction, each of said second microstructures extending longitudinally in the second direction, and having a base that is disposed on said light exit surface of said light guide layer and has two opposite longitudinal edges, two curved faces that extend curvedly respectively from said longitudinal edges of said base, and a fillet that interconnects said curved faces, said fillet having a radius that is larger than 5 µm and is smaller than 500 µm, said base of each of said second microstructures having a second width which is equal in length to a distance between said longitudinal edges and which ranges from 2 µm to 100 µm.

11. A backlight module comprising:
a light guide plate including:
a light guide layer having a light exit surface, a back surface that is opposite to said light exit surface, and a light incidence surface that interconnects said light exit surface and said back surface, and
a first microstructure layer disposed on said back surface of said light guide layer and including a plurality of first microstructures that are spaced apart from one another, each of said first microstructures having a polygonal planar base that is disposed on said back surface of said light guide layer and that has two first edges and two second edges respectively proximal and distal to said light incidence surface of said light guide layer, two first inclined faces that respectively extend inclinedly from said two first edges of said polygonal planar base to each terminate at two terminal sides, and two second inclined faces that respectively extend inclinedly from said two second edges of said polygonal planar base to each terminate at two terminal sides, each of said first inclined faces intersecting a respective one of said second inclined faces at a respective one of two first ridges where one of said two terminal sides of one of said first inclined faces entirely overlaps with one of said two terminal sides of a corresponding one of said second inclined faces, said first inclined faces of each of said first microstructures being arranged along a first direction that is parallel to said light incidence surface of said light guide layer, said second inclined faces of each of said first microstructures being arranged along the first direction, each of said first inclined faces and the respective intersecting one of said second inclined faces being arranged along a second direction that is perpendicular to the first direction, each of said first ridges cooperating with said polygonal planar base to form a first angle that ranges from 5 to 70 degrees, the other one of said two terminal sides of any one of said first inclined faces which does not overlap with one of said two terminal sides of the corresponding one of said second inclined faces cooperating with said polygonal planar base to form a second angle, the other one of said two terminal sides of any one of said second inclined faces which does not overlap with one of said two terminal sides of a corresponding one of said first inclined faces cooperating with said polygonal planar base to form a third angle; and a light source for emitting light toward said light incidence surface of said light guide layer of said light guide plate, wherein said light incidence surface of said light guide layer of said light guide plate is disposed to face said light source.

12. The backlight module as claimed in claim 11, wherein said second angle ranges from 30 to 89 degrees, and said third angle ranges from 1 to 10 degrees.

13. The backlight module as claimed in claim 11, wherein said first angle ranges from 10 to 60 degrees, said second angle ranges from 30 to 50 degrees, and said third angle ranges from 1.2 to 5 degrees.

14. The backlight module as claimed in claim 13, wherein said first angle is 35 degrees, said second angle is 45 degrees, and said third angle is 1.2 degrees.

15. The backlight module as claimed in claim 12, wherein a distribution density of said first microstructures varies along the second direction away from said light incidence surface in such a manner that a first group of said first microstructures disposed most proximal to said light incidence surface and a second group of said first microstructures disposed most distal to said light incidence surface are distributed at a higher density compared to a third group of said first microstructures disposed between the first and second groups.

16. The backlight module as claimed in claim 11, wherein said polygonal planar base of each of said first microstructures further has a third edge that interconnects said first edges, and a fourth edge that interconnects said second edges, each of said first microstructures further having a third inclined face that extends inclinedly from said third edge to intersect each of said first inclined faces at a respective one of two second ridges, and a fourth inclined face that extends inclinedly from said fourth edge to intersect said third inclined face at a fourth ridge and to intersect each of said second inclined faces at a respective one of two third ridges, the other one of said two terminal sides of any one of said first inclined faces which does not overlap with one of said two terminal sides of the corresponding one of said second inclined faces entirely overlapping with the respective one of said second ridges, the other one of said two terminal sides of any one of said second inclined faces which does not overlap with one of said two terminal sides of the corresponding one of said first inclined faces entirely overlapping with the respective one of said third ridges.

17. The backlight module as claimed in claim 16, said fourth ridge extends in the first direction and parallel to said light incidence surface to terminate at two opposite terminal ends, each of which interconnects a respective one of said first ridges, a respective one of said second ridges, and a respective one of said third ridges, said fourth inclined face having a first width which is equal in length to said fourth ridge and which ranges from 1 µm to 30 µm.

18. The backlight module as claimed in claim 11, wherein said first inclined faces intersecting with each other at a second ridge, said second inclined faces intersecting with each other at a third ridge, said two first ridges, said second ridge, and said third ridge being connected with each other at an apex, the other one of said two terminal sides of any one of said first inclined faces which does not overlap with one of said two terminal sides of the corresponding one of said second inclined faces entirely overlapping with said second ridge, the other one of said two terminal sides of any one of said second inclined faces which does not overlap with one of said two terminal sides of the corresponding one of said first inclined faces entirely overlapping with said third ridge.

19. The backlight module as claimed in claim 11, further comprising a second microstructure layer that is disposed on said light exit surface of said light guide layer, and that includes a plurality of second microstructures arranged in the first direction, each of said second microstructures extending longitudinally in the second direction and being a prism, each of said second microstructures having a base that is disposed on said light exit surface of said light guide layer and has two opposite longitudinal edges, two beveled faces that extend inclinedly respectively from said longitudinal edges of said base, and a fillet that interconnects said beveled faces, said beveled faces cooperating to form a vertex angle that is larger than 50 degrees and smaller than 150 degrees, said fillet having a radius that is not smaller than 3 µm and is smaller than 20 µm, said base of each of said second microstructures having a second width which is equal in length to a distance between said longitudinal edges and which ranges from 10 µm to 50 µm.

20. The backlight module as claimed in claim 11, further comprising a second microstructure layer that is disposed on said light exit surface of said light guide layer, and that includes a plurality of second microstructures arranged in the first direction, each of said second microstructures extending longitudinally in the second direction, and having a base that is disposed on said light exit surface of said light guide layer and has two opposite longitudinal edges, two curved faces that extend curvedly respectively from said longitudinal edges of said base, and a fillet that interconnects said curved faces, said fillet having a radius that is larger than 5 μm and is smaller than 500 μm, said base of each of said second microstructures having a second width which is equal in length to a distance between said longitudinal edges and which ranges from 2 μm to 100 μm.

\* \* \* \* \*